Aug. 5, 1947.  E. C. ISOM  2,425,097
NAVIGATIONAL COMPUTER
Filed July 6, 1945  2 Sheets-Sheet 1
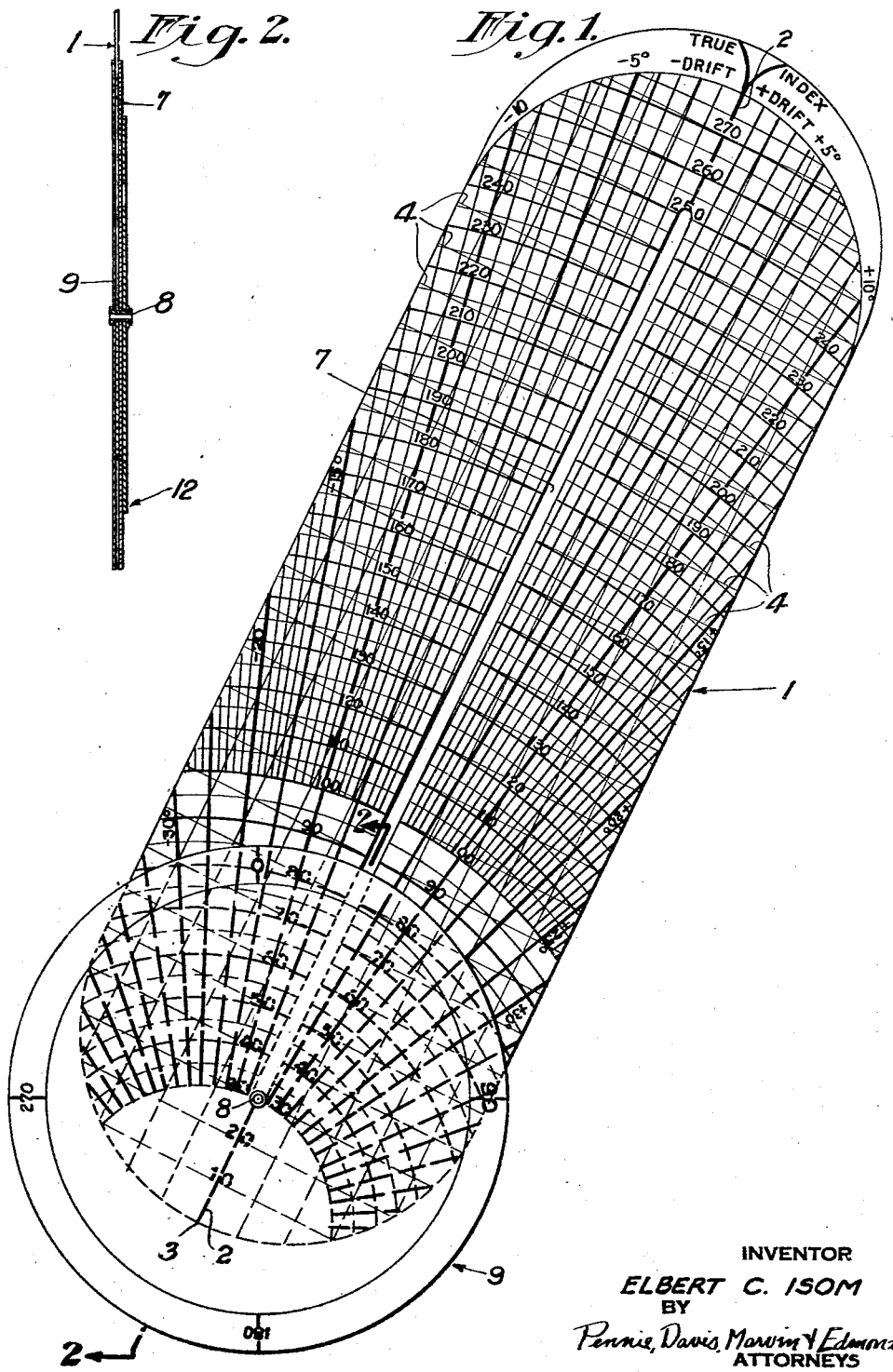
INVENTOR
ELBERT C. ISOM
BY
Pennie, Davis, Marvin & Edmonds
ATTORNEYS

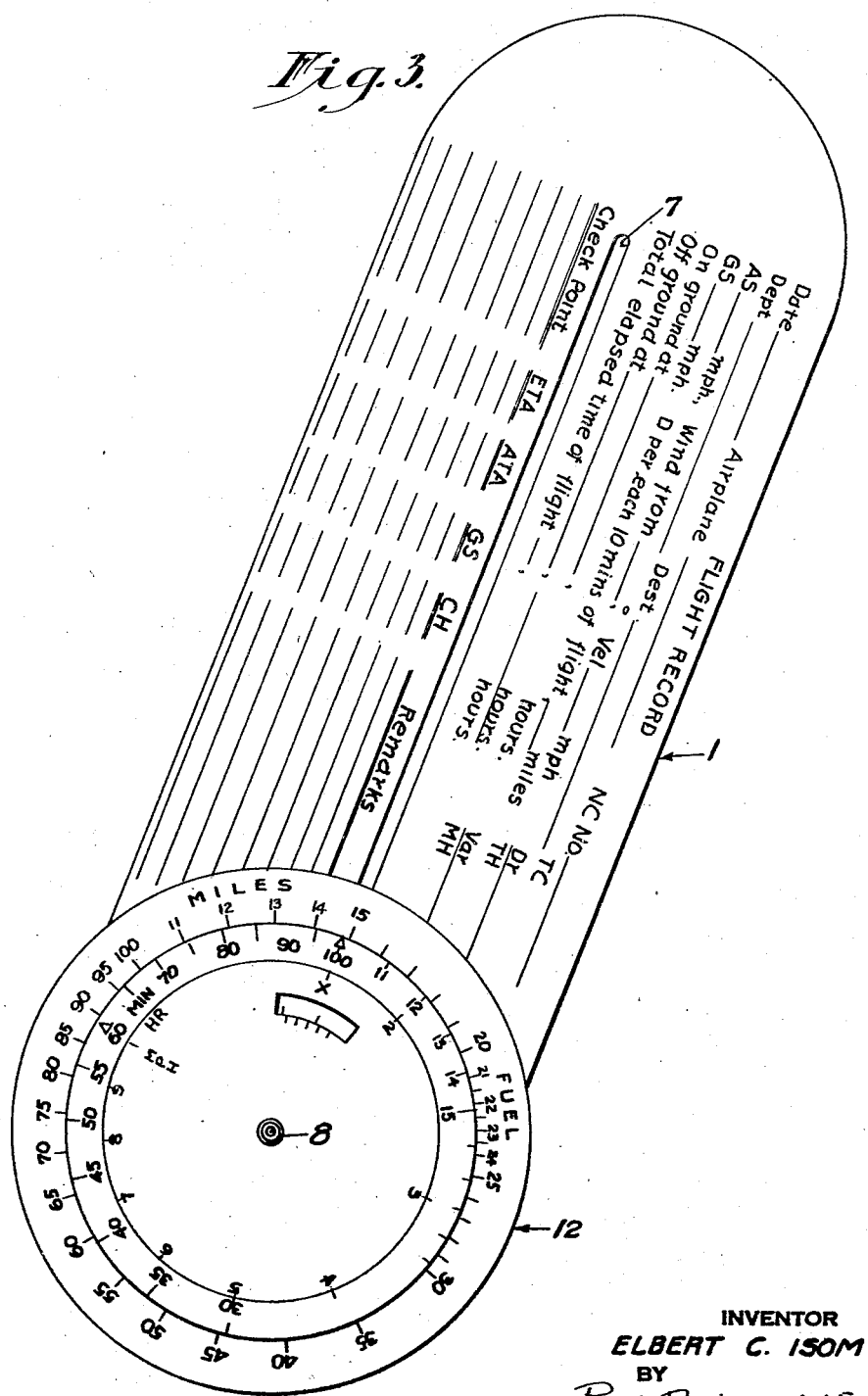

Patented Aug. 5, 1947

2,425,097

UNITED STATES PATENT OFFICE 2,425,097

NAVIGATIONAL COMPUTER

Elbert C. Isom, Garden City, N. Y.

Application July 6, 1945, Serial No. 603,411

3 Claims. (Cl. 235—61)

This invention relates to navigational computers and has for its object the provision of an improved computer for air or surface navigation. More particularly, the invention provides a computer with a flat base having superimposed on its obverse face an off-course grid and a drift grid both having a common center line or index and a compass-rose in operative combination with the grids together with means for rotatably and slidably mounting the compass-rose on the obverse face of the base whereby the center of the compass-rose may slide along the center line or index and be rotated at any position.

The drift grid comprises radial lines reading in degrees, plus on one side of the center line, minus on the other side of the center line, and concentric lines originating from the same center as the radial lines marked in convenient units of distance measure indicating speed in miles per hour, or distance traveled or to be made good from or to any given point. The superimposed off-course grid is laid out in squares, one set of lines being parallel to the center line or index, which is the zero radial line of the drift grid, equally spaced on both sides thereof, and another set of lines being at right angles to the center line, the lines in both directions representing convenient units of distance measure, for example, miles.

Advantageously, the off-course grid and drift grid are superimposed on each other on a sheet of flat and suitably stiff material, and a long narrow slot is provided in the sheet embracing the central line for the grids, said slot forming a means for rotatably and slidably mounting the compass-rose on its axis.

As a matter of convenience, the reverse side of the instrument includes a flight-record form arranged to receive in writing a complete flight log, and for recording the flight information derived from the computations of the instrument. In combination with a pivot or hub for the compass-rose slidable in the slot, is a circular sliderule for computing such things as air-speed, distance, and fuel values, together with pressure-altitude and air-speed corrections.

These and other novel features of the invention will be better understood after considering the following discussion taken in conjunction with the accompanying drawing in which Fig. 1 is a plan view of the obverse side of a navigational computer embodying the invention;

Fig. 2 is a view along line 2—2 of Fig. 1, and

Fig. 3 is a plan view of the reverse side of the instrument of Fig. 1.

The navigational computer of the invention illustrated in the drawings comprises a long, relatively narrow and flat base 1, formed of any suitable stiff and hard material such as metal or a plastic like Celluloid, either clear, colored or pigmented. The base should be sufficiently stiff or rigid that it maintains its shape and size, however, it may be somewhat flexible. I may, for example, use one sheet for support on which the lines and markings are made and bond over this a layer of clear plastic such as Celluloid or a methacrylate to protect the lines and markings from wear. The base is marked along its longitudinal center with a center line or true index 2 (also radial) which intersects the center 3. The drift grid is laid out with radial lines extending from the center 3 on both sides of line 2, those to the left indicating minus or left drift corrections and those to the right plus or right drift corrections. For convenience, the heavy radial lines represent 5° and the finer radial lines one degree. In view of the convergence of these radial lines, the 1° lines do not extend closer to the center than the circular arc 100, but may if desired be extended to the 30 circular arc by drawing these radial lines with a value of 2° each. The other component of the drift grid is the group of equally spaced concentric circular arcs with 3 as their center and marked from 30 to 270 representing miles per hour or miles of distance, depending upon the type of problem to be solved.

The "off-course" grid in fine lines comprises equally spaced lines 4 at right angles to center line 2, each representing five miles, and equally spaced lines 5 parallel to center line 2, also representing 5 miles. This latter grid is used mainly for working "off-course" problems.

The slot 7 embraces the center line 2 and is just wide enough to permit free sliding of the shaft 8 in the form of a rivet by means of which the compass-rose 9 is rotatably and slidably mounted in the slot 7 on the obverse side and the circular slide rule 12 is similarly mounted on the reverse side. In other words, the rivet 8 is the pivot for both the compass-rose and the slide rule. The compass-rose is marked at degree intervals as usual around the periphery, which for purpose of clarity have been largely omitted.

The compass-rose must be of translucent material such as any clear sheet plastic and the front face is ground so it may be marked with a soft pencil. The entire unit of compass-rose and slide rule may be slid along the slot 7.

The reverse side of the base 1 has permanent markings indicating the places to list pertinent data of a flight record. The exterior of the base is ground so that it may be marked with a pencil. This face may also be provided with an exterior cover of clear sheet material to protect the permanent markings underneath and the surface ground for pencil marking.

The circular slide rule 12 is in the usual form and the logarithms of numbers thereon may be marked to represent miles, fuel, minutes or miles per hour as required. In fact the slide rule may be omitted if desired without impairing the operation of the observe side.

Certain uses of the flight computer of the invention in cross country flying are as follows: For example, on a given day it is desired to make a cross country flight from airport A to airport B. On the reverse side of the instrument in pencil (which may easily be erased afterwards) is entered the date, the make of the airplane, the N. C. number, the point of departure (airport A), the point of destination (airport B). From the flight chart is determined the true course from the point of departure to the destination, which is also entered after T. C. on the reverse side of the instrument.

From the flight chart it is found that the true course is 355°. The cruising air speed which is also entered on the reverse side of the instrument is known to be 100 miles per hour at cruising altitude. The local weather bureau states that the wind at 2000 feet, the predetermined cruising altitude, is from 225°, velocity 20 miles per hour. All of this data is entered on line 3 on the reverse side of the instrument.

On the obverse side of the instrument the center pivot of the compass-rose is set at any even number, for example, at exactly 100 miles and turned until 225° on the compass-rose is in the exact center of the center slot (center line 2) in line with the "true index" point as indicated at the top of the instrument. Since the velocity of the wind is 20 miles per hour a short cross mark is made on the 120 mile line (since the center of shaft 8 is set at 100) and a cross mark is made with a soft pencil on the compass-rose over the center line 2, the line between the center of the compass-rose and the 225° mark. The compass-rose is then rotated until the true course 355° coincides with the center line and the compass-rose is then slipped upward until the pencil cross mark indicating the direction and velocity of the true wind is exactly centered on the curve of the true air speed, i. e., 100 miles per hour. The position of the center pivot of the compass-rose will then indicate the ground speed of the airplane at 112 miles per hour and the wind cross on the 100 mile curve will indicate a minus drift correction of approximately 9°.

This information is then entered on the reverse side of the instrument. At the end of line 3 after drift (Dr) is entered the correction of minus 9° to be applied to the true course in order to obtain the true heading (TH). In line 4 the ground speed of 112 miles per hour is entered after G. S. The time and distance slide rule is now used to find the distance traveled over the ground for each 10 minutes of flight. The MPH index on the inner disc is set to 112 on the outer scale. Over the X index on the inner scale will be found the distance in miles traveled for every 10 minutes of flight, i. e., 18.6 miles. This information is entered in the space provided in line 4 on the reverse side of the instrument.

The drift correction of minus 9° applied to the true course in accordance with the sign gives a true heading of 346°. The known variation for the area in which the flight is to take place is 12° westerly which is applied to the true heading with the plus sign giving a magnetic heading for the flight of 358°.

Using a conventional protractor and scale the true course to be flown on the flight map is now marked off in 10 minute intervals, i. e., distance of 18.6 miles and from these intervals are determined prominent check points on the ground. These check points are listed in the check point column on the reverse side of the instrument. Opposite them, in the ETA column the estimated time of arrival (calculated from the time intervals on the flight chart) is entered. In line 6 on the reverse side of the instrument is written at the start of the flight the point of departure and time (24 hour clocks) off the ground which in this example is 1500 hours. Upon arrival at the destination is entered in line 5 on the reverse side of the instrument the name of the destination and the time of arrival which in this case is 1555 hours. Subtracting line 6 from line 5 will give the total elapsed time of the flight or 55 minutes.

During the flight, reference will be made to the time of arrival over the check points which have been recorded and the time entered in the ATA (actual time of arrival) column together with ground speed and compass heading. As long as the ETA and ATA columns check each other closely and the check points appear directly beneath the line of flight, no change in procedure need be made because the ground speed and compass heading will be as calculated. The compass heading representing the magnetic heading 358° plus or minus any deviation of the airplane's compass.

However, if, for example, after flying 40 of the 85 miles of this particular trip on a true course of 355° it is found from one of the check points that the plane is N miles off-course, the indicated correction to the compass heading may be found as follows: In this problem N=8 miles to the right. The center pivot of the compass-rose on the obverse side of the instrument is set at 40 miles and the course on the center line at 355°. Interpolating 8 miles on the off-course grid at right angles to the course a small cross is made at that point. Referring this cross to the drift grid lines it will be found that the plane has drifted approximately 12° to the right, of the desired course. In working an off-course problem of this nature signs are applied in the reverse, therefore, subtracting 12° from the compass heading will give a new compass heading which will cause the track of the plane to parallel the true course of 355° at a distance of 8 miles to the right of it. Since, however, it is desirable to correct the compass heading in order to head for the destination, a full correction is required. This is determined as follows: Since the distance traveled is 40 miles of the 85 mile trip there are 45 miles to go. The center pivot of the compass-rose is slid up to the 45 mile curve, being careful to hold the course of 355° under the true index. The off-course mark now indicates a correction of 10° which added to the correction of 12°, gives a total correction of plus 22°. This is applied to the compass heading with reverse sign, i. e., subtracted from the compass heading and will cause a change in the course which, barring further wind shifts, will put the plane directly on the destination in the next 45 miles.

Many other problems can be solved with this computer, such as determining direction and velocity of true wind by changes of course, radius of action, alternate airport and interception problems, etc.

This computer may also be used advantageously in the navigation of surface vessels. When used for this purpose the final zero of the velocity-distance figures on the obverse side of the instrument are omitted. The scales are then read from 0-28 nautical miles or knots (velocity) instead of from 0-280 statute miles or miles-per-hour as for air navigation over land.

I claim:

1. A navigational computer which comprises a base of thin flat material having an obverse face with a longitudinal center line thereon, a drift grid on the obverse face having a radial line coincident with the center line and a plurality of other radial lines equally spaced on both sides of the center line, a rectangular off-course grid superimposed upon the drift grid with one of its lines coincident with the center line, a transparent compass-rose with an exterior surface for marking to work out problems, and means for mounting the compass-rose rotatable and slidable with respect to the center line whereby the center of the compass-rose may be slid along the center line and rotated at any position thereon.

2. A navigational computer which comprises a base of thin flat material having an obverse face with a longitudinal center line thereon, a drift grid on the obverse face having a radial line coincident with the center line and a plurality of other radial lines equally spaced on both sides of the center line, an off-course grid in square pattern superimposed upon the drift grid with one of its lines coincident with the center line, a transparent compass-rose through which both grids are visible, a long narrow slot in the base coincident with the center line, a shaft for the compass-rose in the slot by means of which the compass-rose is rotatable and slidable along the slot.

3. A navigational computer which comprises a base having an obverse face on which a drift grid comprising radial and arcuate lines is superimposed upon an off-course grid in square pattern, said grids being fixed with respect to each other and the obverse face, and means for mounting a compass-rose in rotatable and slidable cooperation with said grids.

ELBERT C. ISOM.

REFERENCES CITED

The following references are of record in the file of this patent:

UNITED STATES PATENTS

| Number | Name | Date |
|---|---|---|
| 2,339,222 | Hokanson | Jan. 11, 1944 |
| 1,984,390 | Wright | Dec. 18, 1934 |
| 2,350,424 | Smith | June 6, 1944 |

FOREIGN PATENTS

| Number | Country | Date |
|---|---|---|
| 183,347 | Great Britain | 1922 |

OTHER REFERENCES

Weems Air Navigation, 2nd ed., McGraw-Hill, 1938, page 162.

Civil Aeronautics Bulletin No. 24, Government Printing Office, 1940 ($1.00), pages 139 to 145 incl., Fig. 93 and Fig. 94.